Figure 1:
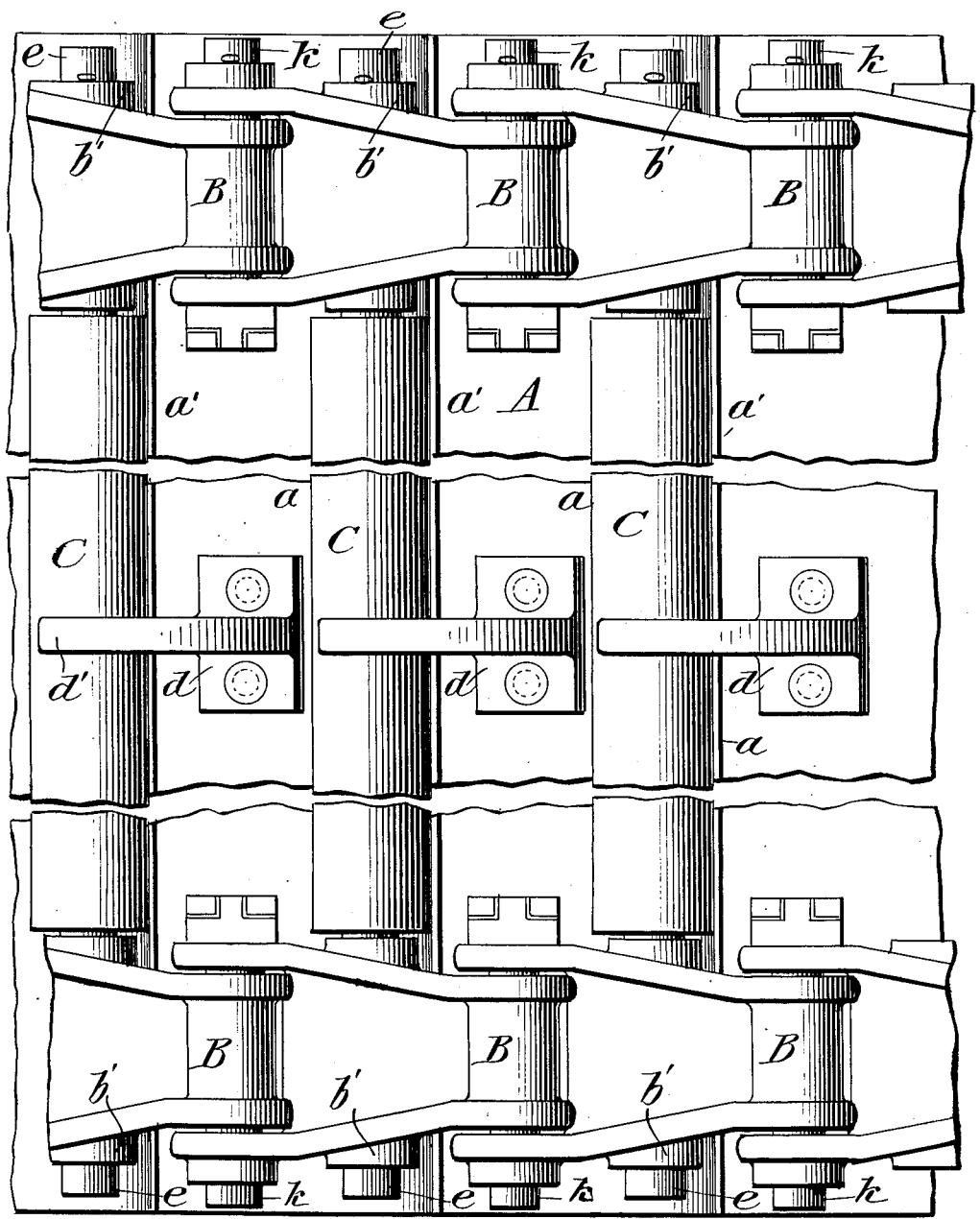

No. 848,236. PATENTED MAR. 26, 1907.
H. G. GINACA.
APRON CONVEYER.
APPLICATION FILED AUG. 31, 1905.

6 SHEETS—SHEET 2.

Witnesses
O. W. Edelin
R. C. Crait

Inventor
H. G. Ginaca
by Pennie & Goldsborough
Att'ys

No. 848,236. PATENTED MAR. 26, 1907.
H. G. GINACA.
APRON CONVEYER.
APPLICATION FILED AUG. 31, 1905.
6 SHEETS—SHEET 3.
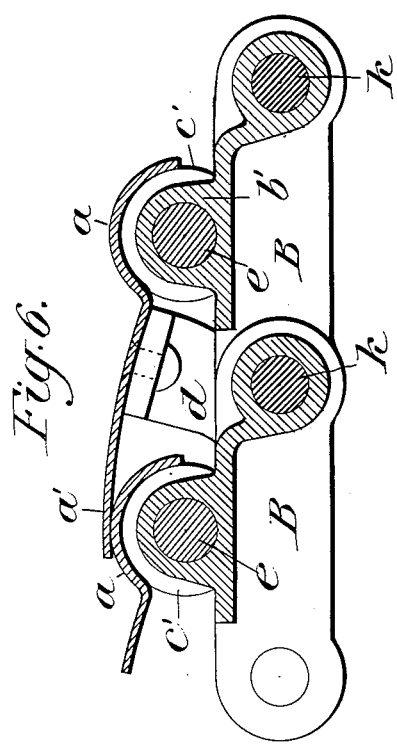
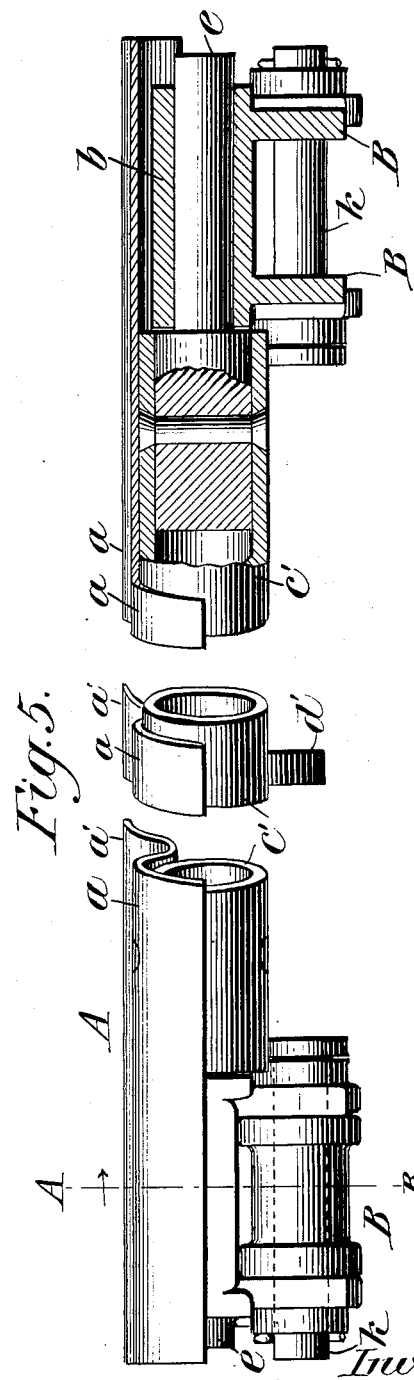
Witnesses:
O. W. Edlin.
R. C. Crum.
Inventor:
H. G. Ginaca
by Pennie & Goldsborough
attys.

No. 848,236. PATENTED MAR. 26, 1907.
H. G. GINACA.
APRON CONVEYER.
APPLICATION FILED AUG. 31, 1905.
6 SHEETS—SHEET 4.
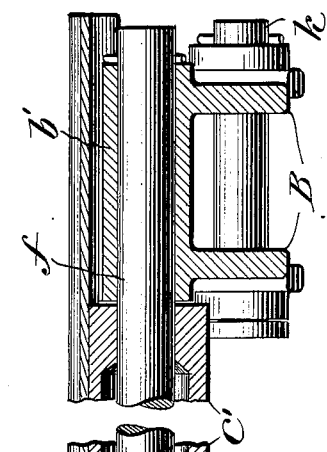
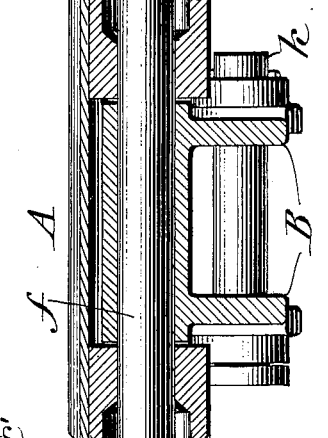
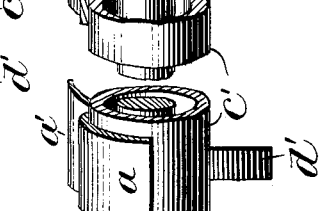
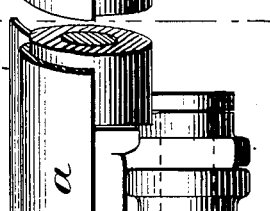
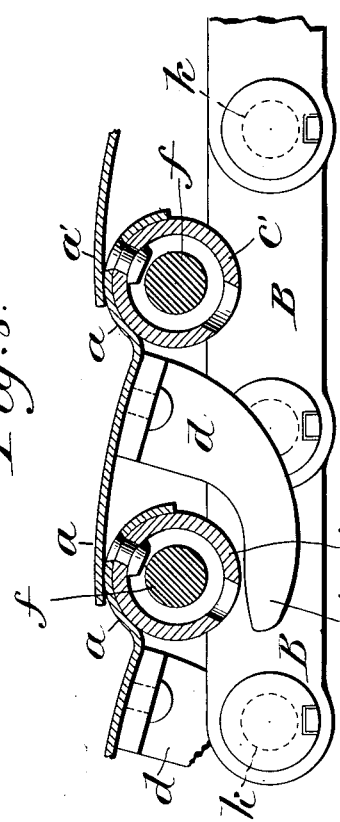
Witnesses:
D. W. Edelin
R. C. Crait
Inventor:
H. G. Ginaca;
by Kenney & Goldsborough,
Attys.

No. 848,236. PATENTED MAR. 26, 1907.
H. G. GINACA.
APRON CONVEYER.
APPLICATION FILED AUG. 31, 1905.
6 SHEETS—SHEET 5.
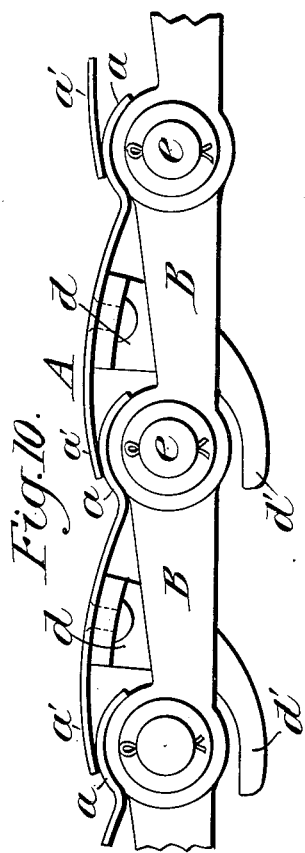
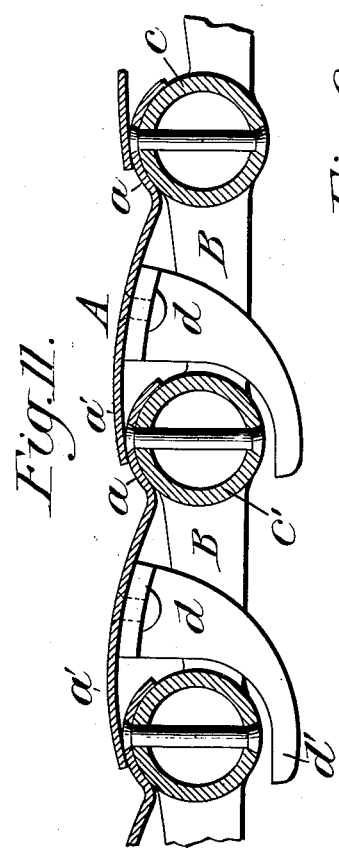
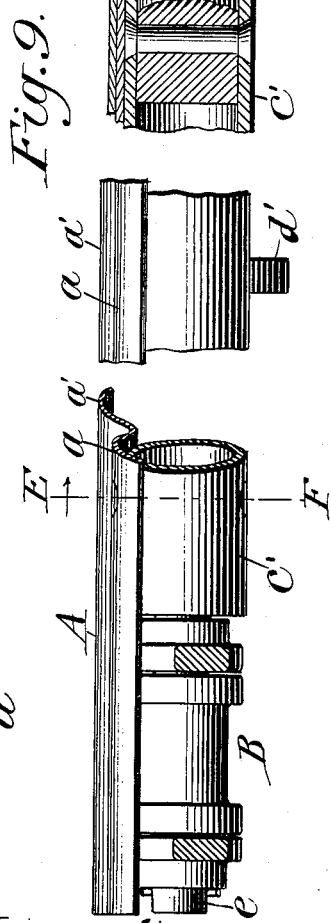
Witnesses:
O. W. Edelin
R. L. Crait
Inventor:
H. G. Ginaca
by Kenne & Goldsborough
attys No. 848,236. PATENTED MAR. 26, 1907.
H. G. GINACA.
APRON CONVEYER.
APPLICATION FILED AUG. 31, 1905.
6 SHEETS—SHEET 6.
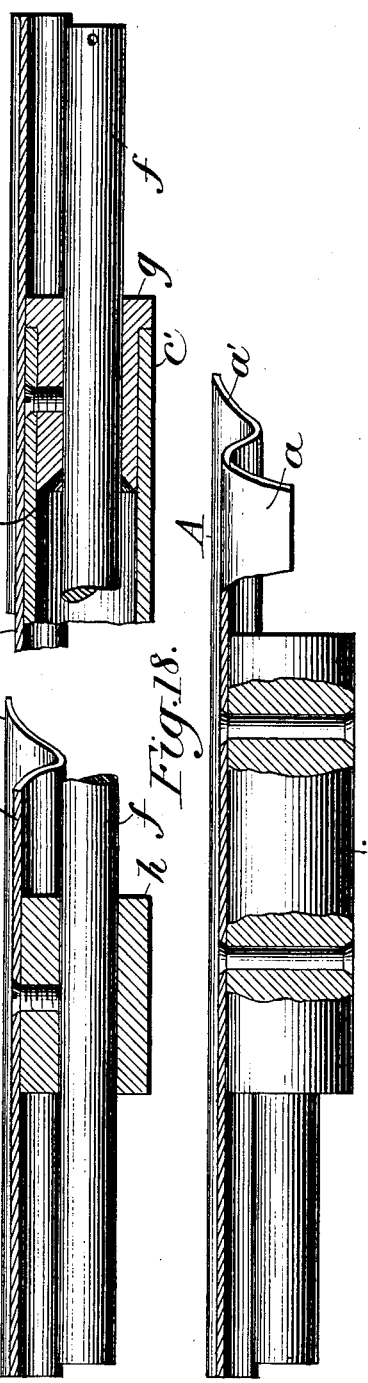
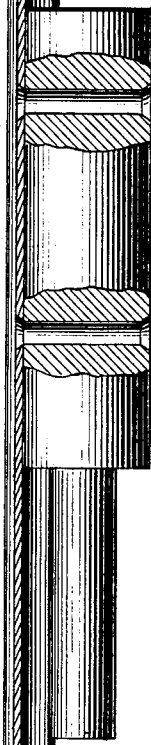
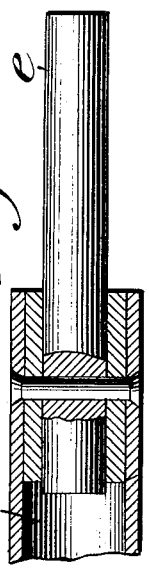
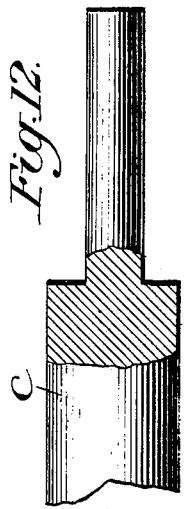
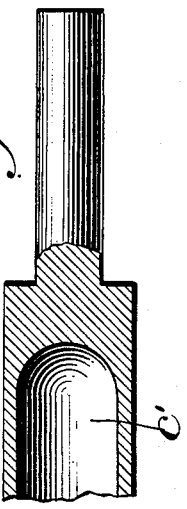
Witnesses:
O. W. Edlin.
R. Crut.
Inventor.
H. G. Ginaca
by Pennie & Goldsborough
Attys

UNITED STATES PATENT OFFICE.

HENRY GABRIEL GINACA, OF HONOLULU, TERRITORY OF HAWAII.

APRON CONVEYER.

No. 848,236.      Specification of Letters Patent.      Patented March 26, 1907.

Application filed August 31, 1905. Serial No. 276,638.

*To all whom it may concern:*

Be it known that I, HENRY GABRIEL GINACA, a citizen of the United States, residing at Honolulu, county of Oahu, Territory of Hawaii, have invented certain new and useful Improvements in Apron Conveyers, of which the following is a specification.

This invention relates to improvements in apron conveyers, particularly to the aprons of conveyers such as are used between sugar-cane mills to convey and elevate the crushed cane from one mill and feed it to the next mill, and has for its object to produce an apron of this character which shall be more efficient than those heretofore employed.

The apron for a conveyer between sugar-cane mills usually consists of flat or slightly-curved metal slats having a link riveted or bolted at each end, the links being connected to form two endless belts with the slats overlapping one another. When the slats are attached between the belts, the links are exposed, allowing the crushed cane or bagasse to fall through said links. When the slats cover the links of the belts to which they are attached, it has heretofore been necessary to cut out or notch the curved side of the slat over the belts, particularly so in order to permit the belts to bend in passing over the idlers used to keep the slack return-apron off from the mill-roller. Such slats usually break at one of these notches. The notching of the slat weakens it as a beam to take the thrust in feeding to the mill. The slats being made of sheet metal and being supported only at their ends by the link belts are structurally weak. Therefore lately in an attempt to strengthen the apron a plurality of parallel link-belts spaced at intervals along the slats has been tried; but this has increased the number of notches in each slat, and thereby added to the chances of breaking. These notches permit crushed cane or bagasse to fall through the apron and fill the pockets of the links and then become wedged in said pockets by the action of the sprocket-teeth. When one sprocket is driving properly and the apron is slipping over the teeth of another sprocket on the same shaft on account of the links being wedged with bagasse, an uneven strain on the slat results, causing an interrupted feed to the mill, the loosening of the rivets or bolts connecting the slat to the belts, and the bending of the slats which often results in the breaking of a slat at a notch. With slats rigidly connected to the links of the belts an opening is necessary between adjacent slats in order that they may not bind when passing over the idlers which support the return portion of the conveyer. These openings allow small pieces of bagasse to fall through and larger pieces to become wedged between the slats. When a heavy maceration is used, these openings between the slats permit a portion of the macerating fluid to escape through same.

All these objections are overcome by this invention, which consists in the novel construction and combination of parts, as will be hereinafter fully described, and pointed out in the claims.

Reference is to be had to the accompanying drawings, forming a part of this specification, in which similar letters of reference indicate similar parts throughout the several views.

Figure 2:
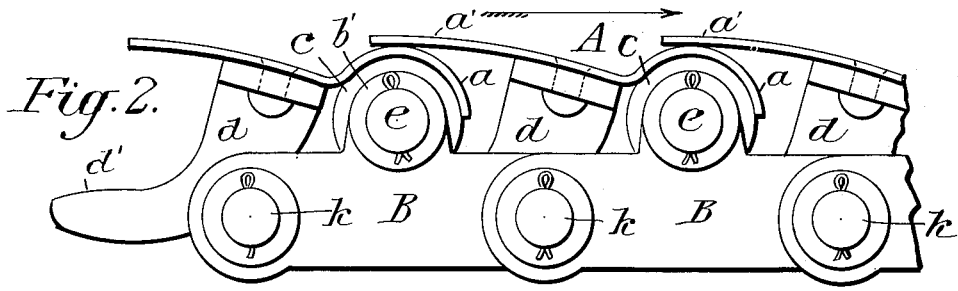
Figure 3:
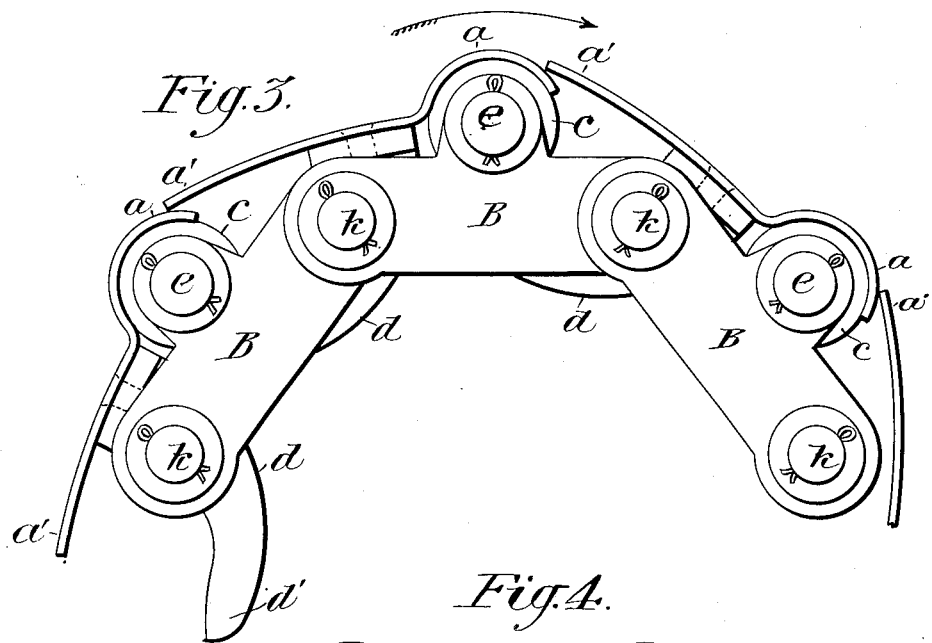
Figure 4:
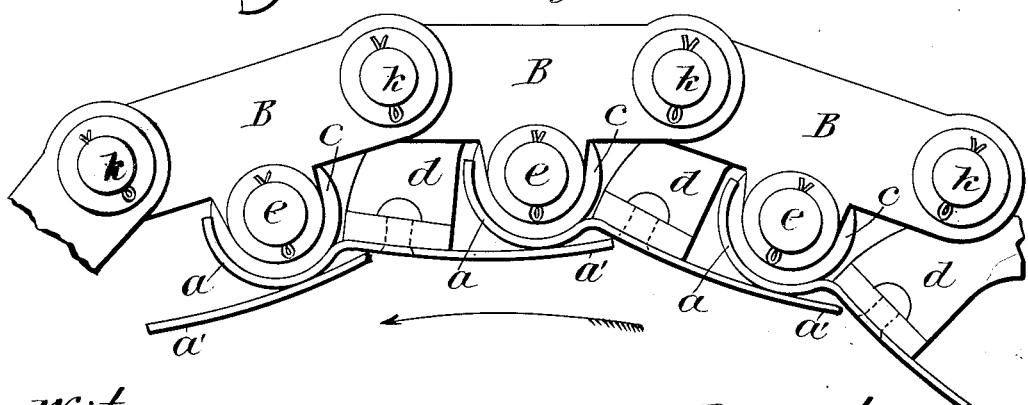

Figure 1 represents in inverted plan a portion of an apron embodying one form of my invention. Fig. 2 represents the same in side elevation. Figs. 3 and 4 represent similar elevations of the same in extreme curved positions, as in passing over sprockets and idlers, respectively. Fig. 5 represents in longitudinal elevation and part section portions of one of the slat units comprising the apron. Fig. 6 is a sectional elevation of two slat units on the line A B of Fig. 5. Fig. 7 represents in longitudinal elevation and part section portions of a slat unit comprising the apron when a plurality of parallel belts are employed. Fig. 8 is a sectional elevation of two such slat units on the line C D of Fig. 7. Fig. 9 represents in longitudinal elevation and part section portions of a slat unit with its trunnions connecting the links together in lieu of the usual pins. Fig. 10 represents in side elevation a portion of such apron, and Fig. 11 a sectional elevation of the same on the line E F of Fig. 9. Figs. 12 to 18, inclusive, are details of various forms of trunnions.

Referring to the drawings, each slat A extends substantially the full width of the apron and is bent or curved along one side $a$, and fits snugly over and is attached to a bar $c$, which in turn is trunnioned at $b'$ in the links B of the endless belts. The balance of the slat A is flat or slightly curved, and its side $a'$ overlaps and rests upon the curved fulcrumed side $a$ of its adjoining slat without any opening between same, such as occurs with slats rigidly attached directly to the link belts. This is not only so when the apron is in a straight line, as shown in Fig. 2, but also when it passes over sprockets at the end of the conveyer, as shown in Fig. 3, or over idlers employed to keep the slack return-apron off from the mill-roller, as shown in Fig. 4. The curved portion a of the slat A is preferably an arc whose center coincides with that of the fulcrum of the slat in order that the overlapping side a' of the adjacent slat may be tangent thereto. The shape of the slat A and the addition of the bar c both tend to stiffen the apron. When a solid round bar c is used, its ends are turned down to trunnion in the links B, as detailed in Fig. 12. For the sake of lightness a tube or pipe c' can be substituted for the solid bar c, in which case ends may be welded on the tube c' and turned down, as shown in Fig. 13, or pins e may be riveted in the ends of the tube c', as shown in Figs. 5, 14, and 15, to trunnion in the links B.

Hooks or fingers d may be attached at intervals along the under side of the slats A, with their prongs d' projecting underneath the bar c of the adjacent slat unit to insure of the overlapping side of each slat always resting upon the curved fulcrumed portion of its neighboring slat. If the hooks d are omitted, the amount of opening between the slats on the return portion of the apron is limited by the heel of the slat striking the links of the endless belts. In this case the apron becomes self-cleaning should any material become lodged on top of the return portion of the apron, as the slats swing apart only on the return portion of the apron. The weight of the crushed cane or bagasse on the apron keeps the slats in contact with one another.

When more than two endless belts are employed, as in wide aprons, the tube c' is made of suitable lengths to fit between the links B of the several belts, and a pintle f is used to trunnion these tubes c' to said links, as shown in Fig. 7. Bushings g may be fastened in the ends of each tube c', through which the pintle f is passed, as detailed in Fig. 16. The bushings g are preferably beveled at one end g' in order that the pintle f may be easily introduced in assembling. It will be noted that the pintle f may be withdrawn, and the slat thereby removed, without disconnecting any of the endless belts, whose links are connected by the usual pins k. A cheaper, but not as strong, a construction consists in attaching sleeves h in lieu of the tube c' to the slat A, with a pintle f through said sleeves h, as shown in Fig. 17, or by riveting trunnions j to the slat A, as shown in Fig. 18.

So far I have shown and described the slats A as trunnioned at b' in the links B above the center line of the belts, with the usual pins k connecting the links B together. If desired, however, the trunnions e for the slats A can replace the connecting-pins k, as shown in Figs. 9, 10, and 11; but in this case the removal of a slat disconnects the endless belts. It will now be noted that the slats A can by any of the above methods be trunnioned in the links B instead of, as heretofore, being rigidly attached directly to the links of the endless belts. The slats are substantially the full width of the apron and have no notches cut out of same, and as there are no openings between the slats the bagasse cannot get through and fill the pockets in the links nor become wedged between the slats. Each slat unit forms a rigid beam, which prevents bending of the slat and takes the thrust in feeding to the mill. The shape of the slats gives the surface of the apron a transversely-corrugated appearance. These corrugations aid in elevating the crushed cane up to and also in feeding it to the mill and aid in the maceration of the crushed cane while on the apron, as the maceration water or juice which percolates through the crushed cane does not run off, but is retained upon the apron and is absorbed by the crushed cane. The apron is preferably run in the direction as indicated by the arrows, for if the slats overlap in a manner similar to the shingles on a roof the macerating liquid (which is applied while the apron is elevating the crushed cane) is prevented from passing through the apron. Also in feeding the crushed cane to the mill where the greatest pressure is exerted on the apron the overlapping sides a' of the slats A are pressed tightly against the fulcrumed sides a of adjacent slats and are supported thereby.

Having thus described my invention, I claim as new and desire to secure by Letters Patent—

1. In an apron conveyer, the combination of a plurality of link belts, and slats extending clear across the conveyer above the belts, each slat being pivoted along one edge only and having the other edge overhanging the edge of the adjacent slat.

2. In an apron conveyer, the combination of a plurality of link belts, and slats extending clear across the conveyer above the belts, each slat pivoted along one edge to the links, and having its other edge overhanging the pivoted edge only of the adjacent slat.

3. In an apron conveyer, the combination of a plurality of link belts, slats extending clear across the conveyer, each slat pivoted at one edge to the links and having its other edge overhanging the edge of the adjacent slat, and a horn or finger on the under side of each slat, projecting beyond the pivoted edge of the adjacent slat.

4. In an apron conveyer, the combination of a plurality of link belts, and overlapping slats extending clear across the conveyer above the belts, said slats being pivoted along one edge only, and having their pivoted edges curved substantially concentric with their pivots, the remaining portion of the slats being curved on single long arcs of greater radius, whereby a groove is formed at the junction of the curved portion that extends across the conveyer.

5. In an apron conveyer, the combination of a plurality of link belts, and overlapping slats extending clear across the conveyer above the belts, each slat being pivoted along one edge and provided with a horn or finger projecting past the pivot of the adjacent slat to limit the upward movement of its free end.

6. In an apron conveyer, the combination of a plurality of link belts, and overlapping slats extending clear across the conveyer, each slat being pivoted at one edge to a link coincident with the pintle at one end of said link, and having a horn or finger projecting under the pintle at the other end of the link to limit the upward movement of the free edge of the slat.

7. In an apron conveyer, the combination of a plurality of link belts, and overlapping slats extending clear across the conveyer above the belts, said slats being secured to tubes or pipes extending between the belts, and pintles passing through the tubes and secured in the links of the belts, the pipes or tubes being trunnioned on the pintles.

8. In an apron conveyer, the combination of a plurality of link belts, and overlapping slats extending clear across the conveyer above the belts, said slats being trunnioned to turn about an axis or pintle secured to the links of the belt above and parallel to the pintles of said links.

In testimony whereof I have signed my name to this specification in the presence of two subscribing witnesses.

HENRY GABRIEL GINACA.

Witnesses:
ROBT. J. PRATT,
ARTHUR F. EWART.